Figure 1:
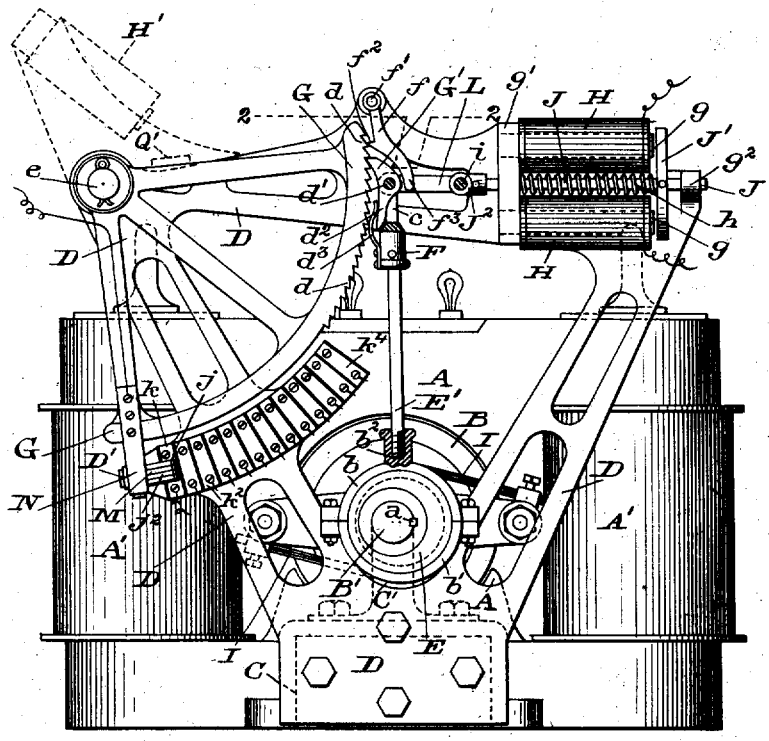

2 Sheets—Sheet 1.

G. H. WHITTINGHAM.

AUTOMATIC DEVICE FOR REMOVING RESISTANCE IN STARTING ELECTRIC MOTORS, &c.

No. 11,545. Reissued May 26, 1896.

WITNESSES :—

Lee I. Van Horn.

Charles B. Mann Jr.

INVENTOR :—

Geo. H. Whittingham

By Chas. B. Mann

ATTORNEY.

2 Sheets—Sheet 2.

G. H. WHITTINGHAM.

AUTOMATIC DEVICE FOR REMOVING RESISTANCE IN STARTING ELECTRIC MOTORS, &c.

No. 11,545. Reissued May 26, 1896.

WITNESSES :-

Lee I. Van Horn.

Charles B. Mann Jr.

INVENTOR :-

Geo H. Whittingham

By Chas B. Mann

ATTORNEY.

UNITED STATES PATENT OFFICE.

GEORGE H. WHITTINGHAM, OF BALTIMORE, MARYLAND, ASSIGNOR TO THE AUTOMATIC SWITCH COMPANY OF BALTIMORE CITY, OF MARYLAND.

AUTOMATIC DEVICE FOR REMOVING RESISTANCE IN STARTING ELECTRIC MOTORS, &c.

SPECIFICATION forming part of Reissued Letters Patent No. 11,545, dated May 26, 1896.

Original No. 518,906, dated April 24, 1894. Application for reissue filed March 6, 1896. Serial No. 582,150.

*To all whom it may concern:*

Be it known that I, GEORGE H. WHITTINGHAM, of Baltimore city, in the State of Maryland, have invented certain new and useful Improvements in Automatic Devices for Removing Resistance in Starting Electric Motors and Replacing Same; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

This invention relates to an automatic starting device for electric motors, and has for its object to gradually reduce the resistance in the armature-circuit of the motor automatically when the current is turned on and the motor starting by cutting out the coils of resistance one after the other from that of the greatest resistance to that of the least resistance, and maintaining it in this position during the running of the motor, so that when the circuit through the motor is first completed to start the motor the current will meet with the greatest resistance, and when the motor is fully running there will be the least resistance to the passage of the current. This is done to prevent the burning out of the armature of the motor when starting. When the current is shut off, this device operates to automatically replace the resistance in the circuit in readiness to be started again. By my invention the power for operating the resistance-controlling device is obtained from the motor-armature, and each revolution thereof imparts to the contact-shoe of said resistance-controlling device a movement in the direction of cutting out the resistance from the armature-circuit until said resistance is entirely cut out. The movement of the contact-shoe in the direction of cutting out the resistance is effected when starting the motor and without regard to the speed of rotation of the motor-armature.

In order to make the improvements clearly understood, I have shown in the accompanying drawings means for carrying the same into practical effect, without, however, intending to limit my invention to this particular construction, for the invention as broadly conceived by me and as defined in my claims may be embodied in many other forms.

Figure 2:
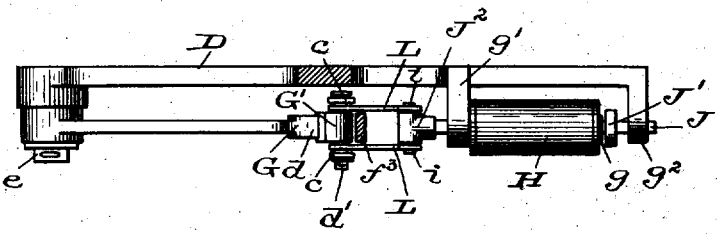
Figure 3:
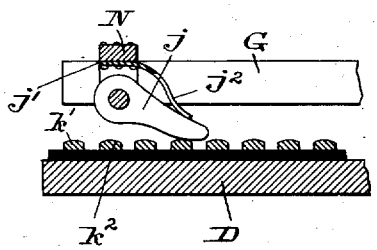
Figure 4:
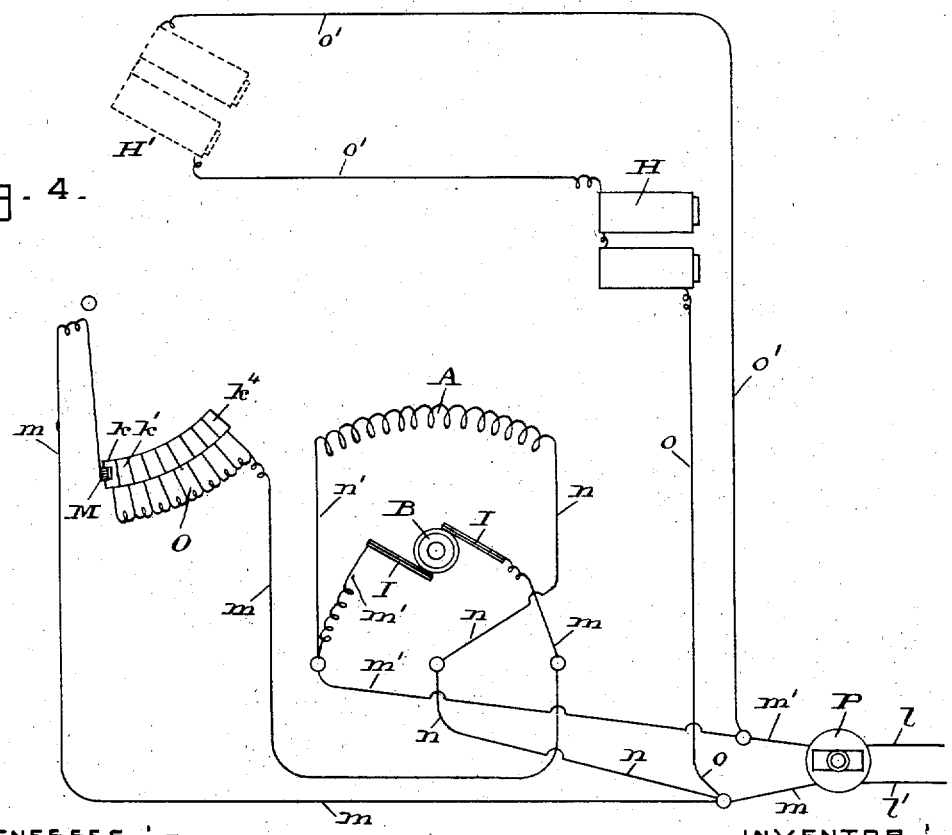

In the drawings, Figure 1 shows an end view of a motor provided with my improved automatic resistance-controlling device. Fig. 2 is a horizontal section of the device, taken on the line 2 2 of Fig. 1. Fig. 3 is a section through the resistance-plates, taken on line 3 3 of Fig. 1. Fig. 4 shows a diagram of the circuits.

The letter A designates the field-magnets of the motor, and A′ the coils thereof.

B designates the armature, and B′ the armature-shaft, which is journaled in bearings C′ on the base C of the motor.

A suitable upwardly-projecting framework D is bolted to the outside of the bearing-block C′ and base C at the commutator end of the motor. Mounted on this framework D is a segment-shaped ratchet-bar G, a holding-pawl $f$, and electromagnets H, all hereinafter referred to.

I designates the commutator-brushes.

In the present instance the commutator end of the armature-shaft B′ is extended beyond the outside of the bearing-block C′ and has mounted thereon an eccentric E, fastened by a key $a$. Around this eccentric is a split eccentric-strap comprising two parts $b$ $b'$, held together by suitable bolts $b^3$. The upper half $b$ of the eccentric-strap has a threaded socket $b^2$ to receive one end of an eccentric-rod E′, on the other end of which is mounted a yoke F, having two arms $c$. The ratchet-pawl G′ is pivoted on a pin $d'$ between the said arms $c$, and its free end engages the teeth $d$ of the segment-shaped ratchet-bar G, connected with a hub which is pivoted on a stud $e$, fixed to the upwardly-extending frame D. The ratchet-teeth $d$ extend along only a portion of the length of the bar G, and the remainder has a smooth surface. The ratchet-pawl, previously referred to, has a depending arm $d^2$, which engages the free end of a leaf-spring $d^3$, attached to the yoke F. The function of this spring is to keep the pawl in engagement with the teeth of the ratchet-bar G. A holding-pawl $f$, pivoted on a stud $f'$, also on the frame D, has a hook end $f^2$ to also engage the teeth $d$ of the segment ratchet-bar G. This pawl has a depending arm $f^3$ to engage the ratchet-pawl G′ for a purpose hereinafter described. A pair of electromagnets H have position on the frame D opposite the segment ratchet-bar G, one end of each magnet-core $g$ being fastened in a rib or flange $g'$, extending across the fixed ends of the magnets, said flange $g'$ being integral with the frame D. A longitudinally-movable rod J passes between the electromagnets, and one end extends through the flange $g'$, which forms one bearing therefor. This extending end of the rod J is provided with a head $J^2$, having a lateral hole which receives a cross-pin $i$. A pair of link-plates L, one at each side of the head $J^2$, have one end pivoted on the pin $i$ and the other on the pin $d'$ between the ratchet-pawl G′ and the arms $c$ of the yoke F. An additional bearing $g^2$ on the frame D is provided for the other end of the rod J. An armature J′ is fixed on the rod J between its bearings $g'$ $g^2$ and extends crosswise of the same and coacts with the electromagnets H. A spiral spring $h$ around the rod J is interposed between the flange $g'$ and armature J′ and serves to keep the armature normally away from the magnets H. It will be seen that when the magnets H are not energized the armature J′ will not only be away from the magnets, but the ratchet-pawl G′ and holding-pawl $f$ will be disengaged from the teeth of the ratchet-bar G, which is thereby allowed to fall against a suitable stop D′ on the frame D. A contact-shoe M, made up of a series of plates $j$, adjacent to one another, is pivoted on an arm N, attached to the segment-shaped bar G, but insulated therefrom. A plate $j'$ of spring material has one edge fixed to the said pivot-arm N and its other edge slitted to form a series of spring-tangs $j^2$, each of which bears on a corresponding plate $j$ of the contact-shoe M. A series of contact-plates $k$ $k'$ $k^2$, &c., insulated from each other, are respectively connected with a resistance-coil O. These contact-plates are mounted on the frame D on an arc described from the pivot-stud $e$, and are successively engaged by the contact-shoe M, which, however, is always in engagement with one of them.

The operation is as follows: When the motor is connected with the line $l$ $l'$, by moving the switch P the current will flow along the line $m$, through the shoe M, resistance-coil O, armature B, then along the line $m'$ back to the switch. The current will also flow from line $m$ along line $n$, coil A′ of field-magnet, and then return to line $m'$ along line $n'$. Another portion of the current from main line $m$ will flow along line $o$ to electromagnets H, and then return along line $o'$ to line $m'$. The current by flowing as just stated will energize the field-magnets and armature of the motor, and at same time the electromagnets H, which will attract and move the armature J′ against the action of the spring $h$, whereby the pawls G′ and $f$ are brought into engagement with the teeth of the ratchet-bar G. Now, as the current has also gone to the field-magnets and armature, the latter will be caused to rotate with its shaft, imparting motion to the eccentric, which in turn reciprocates the eccentric-rod and pawl G′, which latter lifts the ratchet-bar G, one tooth at a time, until the smooth surface of the ratchet-bar reaches the said pawl, whereupon the upward movement ceases, the holding-pawl $f$ coacting with and holding the bar elevated as the ratchet-pawl G′ retracts. By this intermittent upward movement the shoe M, connected with the ratchet-bar G, is moved over the contact-plates of the resistance-coil, beginning with the one of greatest resistance and gradually diminishing until the last plate is reached, where there is practically no resistance. When the shoe M has reached this last plate $k^4$, the pawl G′ simultaneously reaches the smooth surface on the ratchet-bar G, and consequently will not lift the bar any higher. When the shoe M has reached this last plate $k^4$—the point of lowest resistance—the said circuit is maintained thereat during the run of the motor. It will now be seen that when the current is shut off by the switch P the field-magnets, armature, and electromagnets will become inert, and consequently the pawls G′ and $f$ be disengaged from the ratchet-bar G, which will then fall, and the shoe M again brought into contact with the plate $k$, indicating the greatest resistance of the coil, whereupon the apparatus is in readiness for again starting the motor. It is obvious that a second pair of electromagnets H′ (indicated by broken lines in Figs. 1 and 4) could be placed in the circuit with the electromagnets H and energized simultaneously therewith. This second pair of magnets would also be mounted on the frame D and would attract an armature Q′, (shown in broken lines,) rigid on one arm of the ratchet-bar G, so that when the pawl G′ has raised the ratchet-bar G as high as it can, and is in engagement with the tooth adjoining the smooth surface, the magnet H′ will elevate the bar slightly higher to prevent the pawl hammering up against the said last tooth, but allow it to play freely on the smooth surface of the ratchet-bar. It will also be seen that instead of connecting the starting and stopping mechanism as here shown it could be driven independently—that is, a small motor could be employed and an independent circuit for this auxiliary motor and the electromagnets H used, but said circuit made simultaneous with the one through the main motor, which latter circuit passes only through the shoe M and resistance-coil O of the starting mechanism. The two are in other respects independent of one another. It will be further observed that the two could be connected up mechanically—as, for instance, by a belt from the motor driving a shaft on which the eccentric is mounted—and the electromagnets suitably connected in the line-circuit as it leaves the switch.

It will now be seen that the main object of my invention is to provide an automatic device for cutting out gradually the resistance to the current flowing to the motor when the same is turned on, so that each revolution of the motor-armature will impart movement to the contact-shoe of said device and without regard to the speed of rotation of the said armature. When the motor is fully running, there will be practically no resistance to the passage of the current, and when the current is shut off the said resistance will be again introduced automatically in readiness for again starting. By this means of controlling the flow of the current the motor will always be governed by its load—that is, when the load is heavy the resistance will slowly and gradually be cut out or diminished until the full speed and power are obtained, the motor starting up slowly; but when the load is light the motor will start up fast and the resistance be rapidly cut out or diminished, thus allowing the motor to speed up quickly.

Having thus described my invention, I claim—

1. In an automatic starting device for electric motors, the combination of a motor; a resistance in series with the armature when starting the motor; a contact-shoe engaging the resistance; and a direct mechanical connection between the armature and the contact-shoe, whereby each revolution of the armature imparts to the contact-shoe a positive movement and gradually cuts out the resistance from the armature-circuit and maintains said circuit at the point of lowest resistance during the run of the motor.

2. The combination of a motor; a resistance-coil in electrical connection with the armature; a movable contact device in circuit with said coil; a pawl and ratchet operated by the motor-armature and adapted to impart to the contact device a limited movement in the direction which reduces the resistance of the armature-circuit; and means for disengaging the pawl and ratchet when the supply of electricity is cut off.

3. In an automatic starting device for electric motors, the combination of a motor; a resistance in series with the armature when starting the motor; a contact-shoe engaging the resistance; a direct mechanical connection between the armature and the contact-shoe which is operative in the direction of cutting out the resistance from the armature-circuit, whereby said circuit is maintained at the point of lowest resistance during the run of the motor; and further means whereby the cessation of the current disengages the said mechanical connection and allows the contact-shoe to return to its original position where the highest resistance is replaced, for the purpose set forth.

4. In an automatic starting device for electric motors, the combination of the field-magnets; the armature; a resistance-coil in series with the armature; a series of contact-plates connected with the said coil; a movable ratchet-bar; a contact-shoe connected with said bar and movable over said contact-plates; a ratchet-pawl actuated by the armature; and means for causing the ratchet-pawl to engage said ratchet-bar and impart to it an intermittent movement only in the direction which reduces the resistance of the armature-circuit, for the purpose set forth.

5. In a resistance-controlling device for electric motors, the combination of the field-magnets; the armature; a resistance-coil; a series of contact-plates each connected with the said coil; a movable ratchet-bar; a contact-shoe connected with the said ratchet-bar and moving over the contact-plates successively, said field-magnets, armature, resistance-coil and contact-shoe all being connected with a line-circuit; a reciprocating ratchet-pawl to engage the said ratchet-bar and impart an intermittent movement to it and the contact-shoe; and means to disengage the pawl from the ratchet-bar when the motor-circuit is broken to allow the ratchet-bar and contact-shoe to return to their normal position.

6. In a resistance-controlling device for electric motors, the combination of the field-magnets; the armature; the armature-shaft; a resistance-coil; a series of contact-plates each connected with the said coil; a contact-shoe to engage the said plates and in circuit with the resistance-coil, field-magnets, armature and line-circuit; a movable ratchet-bar; a ratchet-pawl to engage the ratchet-bar and impart an intermittent movement to it and to the contact-shoe; an eccentric on the armature-shaft to reciprocate the ratchet-pawl; a spring to coact with the ratchet-pawl and keep it away from the ratchet-bar; and an electromagnet energized simultaneously with the field-magnets and armature to coact with the said ratchet-pawl and place it into engagement with the ratchet-bar against the action of the spring.

7. In a resistance-controlling device for electric motors, the combination of the field-magnets; the armature; the armature-shaft; a resistance-coil; a series of contact-plates each connected with the resistance-coil; a contact-shoe to engage the said plates and in circuit with the resistance-coil, field-magnets, armature and line-circuit; a movable segment-shaped ratchet-bar; a ratchet-pawl to engage the ratchet-bar and impart an intermittent movement to it and to the contact-shoe; an eccentric on the armature-shaft to reciprocate the ratchet-pawl; a spring to coact with the ratchet-pawl and keep it away from the ratchet-bar; an electromagnet energized simultaneously with the field-magnets and armature to coact with the said ratchet-pawl and place it into engagement with the ratchet-bar against the action of the spring; and a holding-pawl to engage the ratchet-bar but like the ratchet-pawl dependent upon said electromagnet and spring.

8. In an automatic starting device for electric motors, the combination of a motor; a resistance in series with the armature of the motor when starting same; a contact-shoe engaging the resistance; and means controlled by the current whereby upon starting the motor each revolution of the armature shall impart to the contact-shoe a movement in the direction of cutting out the resistance from the armature-circuit until said resistance is entirely cut out and maintain said circuit at the point of lowest resistance during the run of the motor.

9. In an automatic starting device for electric motors, the combination of a motor; a resistance in series with the armature of the motor when starting the same; a contact-shoe engaging the resistance; and means controlled by the current, whereby the rotation of the motor-armature, without regard to its speed, will move the contact-shoe in the direction of cutting out the resistance from the armature-circuit until said resistance is entirely cut out.

In testimony whereof I hereunto affix my signature in presence of two witnesses.

GEORGE H. WHITTINGHAM.

Witnesses:

CHARLES B. MANN, Jr.,

C. CALVERT HINES.